US012620748B2

(12) United States Patent
Heckelsmueller et al.

(10) Patent No.: US 12,620,748 B2
(45) Date of Patent: May 5, 2026

(54) CHARGING SOCKET FOR A VEHICLE

(71) Applicant: LISA DRÄXLMAIER GMBH, Vilsbiburg (DE)

(72) Inventors: Stephan Heckelsmueller, Eching (DE); Johannes Tausch, Pfaffenhofen an der Ilm (DE)

(73) Assignee: LISA DRAEXLMAIER GMBH, Vilsbiburg (DE)

( * ) Notice: Subject to any disclaimer, the term of this patent is extended or adjusted under 35 U.S.C. 154(b) by 256 days.

(21) Appl. No.: 18/538,080

(22) Filed: Dec. 13, 2023

(65) Prior Publication Data

US 2024/0195111 A1     Jun. 13, 2024

(30) Foreign Application Priority Data

Dec. 13, 2022    (DE) ..................... 10 2022 133 099.0

(51) Int. Cl.
| | |
|---|---|
| *H01R 13/504* | (2006.01) |
| *B60L 53/16* | (2019.01) |
| *B60L 53/302* | (2019.01) |
| *B60R 16/02* | (2006.01) |

(52) U.S. Cl.
CPC ............ *H01R 13/504* (2013.01); *B60L 53/16* (2019.02); *B60L 53/302* (2019.02); *B60R 16/0207* (2013.01); *H01R 2201/26* (2013.01)

(58) Field of Classification Search
CPC . H01R 13/504; H01R 2201/26; B60L 53/502; B60L 53/16; B60R 16/0207
USPC .......................................................... 439/485
See application file for complete search history.

(56) References Cited

U.S. PATENT DOCUMENTS

| | | | | |
|---|---|---|---|---|
| 10,535,940 | B2 * | 1/2020 | Fuehrer | .................. B60L 53/16 |
| 10,618,418 | B2 * | 4/2020 | Turik | ..................... H01R 24/28 |
| 10,644,439 | B2 | 5/2020 | Fuehrer et al. | |
| 10,953,761 | B2 | 3/2021 | Arai | |
| 2019/0020140 | A1 * | 1/2019 | Fuehrer | .................. B60L 53/16 |
| 2019/0202302 | A1 * | 7/2019 | Turik | ..................... H01R 24/28 |
| 2021/0347270 | A1 * | 11/2021 | Cole | ......................... B60L 53/16 |
| 2021/0380006 | A1 * | 12/2021 | Bowler | .................. B60L 53/16 |
| 2022/0216654 | A1 | 7/2022 | Hashimoto et al. | |

FOREIGN PATENT DOCUMENTS

EP          2881690 B1      8/2016

* cited by examiner

*Primary Examiner* — Gary F Paumen
(74) *Attorney, Agent, or Firm* — Burris Law, PLLC

(57) ABSTRACT

A charging socket for a vehicle, includes at least two contact elements, each contact element having a latent heat storage unit. The latent heat storage unit includes a phase change material arranged in a container. The container is thermally coupled to the respective contact element and is arranged in a current path between the contact element and a terminal of the contact element for a line of a wiring harness of the vehicle.

10 Claims, 3 Drawing Sheets

CHARGING SOCKET FOR A VEHICLE

CROSS-REFERENCE TO RELATED APPLICATIONS

This application claims priority to and the benefit of German Application No. 10 2022 133 099.0 filed on Dec. 13, 2022. The disclosure of the above application is incorporated herein by reference.

FIELD

The present disclosure relates to a charging socket for a vehicle.

BACKGROUND

The statements in this section merely provide background information related to the present disclosure and may not constitute prior art.

An electrically powered vehicle may comprise a charging socket for charging a traction battery of the vehicle. A charging plug of a charging cable can be inserted into the charging socket. Via the charging socket, the traction battery can be charged by a charging device, i.e., a charging station, a wall box or a so-called charging brick. Electrical contact elements for establishing an electrically conductive connection to the charging plug are arranged in the charging socket. The contact elements may be designed as contact pins and establish the electrically conductive connection to corresponding mating parts in the charging plug.

The connection has a contact resistance. Due to the contact resistance, a power loss in the form of heat occurs at the connection. The power loss is dependent on the flow of current through the connection. In the case of large charging powers, the contact elements may become warm, or hot, during the charging. The power loss thus limits a possible charging power. The power loss may be reduced by higher charging voltages.

SUMMARY

This section provides a general summary of the disclosure and is not a comprehensive disclosure of its full scope or all of its features.

The present disclosure provides an improved charging socket with a simple design. An improvement may in this case relate, for example, to improved cooling of the contact elements.

The present disclosure provides heavily loaded contact elements of a charging socket that are thermally coupled directly to a latent heat storage unit. The latent heat storage unit has a high heat capacity since a phase change of a phase change material (PCM) takes place in the latent heat storage unit at a predefined temperature and the phase change uses a large amount of energy. A temperature rise beyond the predefined temperature is substantially inhibited by the energy absorption during the phase change until all the phase change material has changed phase. Only after the phase change is completed does the temperature rise further.

The phase change material is, in this case, held in two containers, which are respectively arranged directly behind the contact elements and therefore in a current path from the forward line to the return line. The containers, therefore have a twofold or dual function, in that they enclose the phase change material and conduct current.

By the approach proposed here, heat generated in the contact elements can be absorbed very close to the point of origin. By arranging the latent heat storage unit in the current path, the amount of material used may be reduced since the container of the latent heat storage unit is used to conduct current and heat. In addition, thermal energy is absorbed by the phase change material at an approximately constant temperature until all the phase change material has changed its phase. If there is enough phase change material, a temperature rise beyond this temperature can be inhibited.

A charging socket for a vehicle is proposed, wherein the charging socket comprises at least two contact elements each having a latent heat storage unit. The latent heat storage unit comprises a phase change material arranged in a container. The container is thermally coupled to the respective contact element and is arranged in a current path between the contact element and a terminal of the contact element for a line of a wiring harness of the vehicle.

A charging socket may comprise at least two contact elements for transmitting electrical energy from a charging cable to an electrically powered vehicle. The charging socket may comprise different contact elements for different types of current. DC contact elements, in particular, may be designed according to the approach proposed here. The charging socket may correspond to a normalized standard for charging sockets. In the installed state, electrical component parts of the vehicle may be connected to the charging socket via a wiring harness of the vehicle. The wiring harness may comprise at least two electrical lines. The lines may, for example, be cables or busbars. Each line of the wiring harness may be electrically conductively attached to its own terminal of the charging socket. The terminals may be arranged on an inner side of the charging socket. Each terminal may be electrically conductively connected to one of the contact elements via its own current path.

The contact elements may be configured to form a plug connection with corresponding mating parts. The contact elements of the charging socket may be configured as contact pins, which can form the plug connection with corresponding jacks as the mating parts. The mating parts, or jacks, may be arranged in a charging plug. The contact elements may be made of a metallic material. The metallic material is, in one form be a copper material.

The contact elements may be regarded as heat sources, since heat is generated because of a contact resistance of the plug connections and an internal resistance when a current flows through the plug connection. So that heat generated at the contact element can be dissipated, a temperature gradient is desired between the heat source and a heat sink.

The heat sink is, in this case, a latent heat storage unit. The latent heat storage unit contains a phase change material. The phase change material changes between a solid phase and a liquid phase within a predefined temperature range. The phase change material can absorb or release energy during the phase change without the temperature substantially increasing or decreasing. The energy absorbed during the phase change may also be referred to as latent heat.

The phase change material may, for example, be a paraffin material or a salt material. The temperature range of the phase change may be determined by a composition of the phase change material. The temperature range may be adjusted so that the contact element does not become hotter than a desired target temperature.

A container for the phase change material may consist of a metallic material having electrically conductive and thermally conductive properties. The container may, for example, be made of an aluminium material or a copper material. The container may be connected directly to the contact element. The container may be electrically conductively and thermally conductively connected to the contact element. The container may be part of the current path to the terminal for the cable of the cable harness. When electrical current flows from the contact element to the terminal, current flows through the container.

The contact element may protrude from a wall of the latent heat storage unit. The wall may be part of the container. The contact element may be arranged as close as possible to the latent heat storage unit. The resulting heat path between the contact element and the latent heat storage unit is thus short and has a low thermal resistance.

The contact element may comprise a normalized plug region, or contact region, and a transition region to the latent heat storage unit. The transition region may have a larger conductor cross section than the plug region. A conductor cross section of the contact element may be defined by the standard in the normalized plug region. The plug region may be a bottleneck for the heat to be dissipated. By a thicker transition region, the transition region can have a lower thermal resistance than the plug region. The heat can therefore flow rapidly through the transition region to the latent heat storage unit.

The contact element may be welded to the latent heat storage unit. Alternatively, the contact element may be screwed to the latent heat storage unit. A very low thermal resistance between the contact element and the container may be achieved by welding. The contact element may be welded to the container by laser welding. In particular, the same or similar metallic materials may in this case be welded by laser welding. For example, copper materials may be welded to one another by laser welding.

The contact element may be welded to the latent heat storage unit by friction welding. Different materials may be welded materially to one another by friction welding. By friction welding, for example, the contact element made of copper material may be welded onto the container made of aluminium material.

The contact element and the terminal may be arranged on opposite sides of the latent heat storage unit. The latent heat storage unit may be arranged between the contact element and the terminal. The current path may run through the latent heat storage unit from one side to the other side.

The container may comprise a tightly welded lid. The phase change material may be enclosed hermetically in the container by a welded lid. No extraneous substances can enter the phase change material through the welded lid. The temperature of the phase change may thus remain constant. The lid may alternatively comprise a seal. The lid may also be screwed or pressed on.

The container may be pressure-resistant. The phase change material may build up a pressure in the container in the event of a volume change. The volume change may be initiated by a temperature change and/or the phase change. The container may be dimensioned so that the container is not deformed, or at least is not substantially deformed, under the resulting pressure. Alternatively, the container may comprise a pressure compensating element.

The container may have fins on an inner side to increase a heat transfer area to the phase change material. The container may be finned. The container may consist of a die casting. Thin fins may also be produced well by die casting. Alternatively, the container may be produced with a smaller number of thicker fins by extrusion. By the fins, a limited thermal conductivity of the phase change material may be compensated for by a high thermal conductivity of the fins. The heat may be conducted into a volume of the phase change material by the fins.

The two or more latent heat storage units may be electrically insulated from one another. The latent heat storage units may be at different electrical potentials during operation. For example, the latent heat storage units may be at a positive potential and a negative potential of a traction battery of the vehicle. The air gaps and creepage paths desired for a rated voltage may be maintained between the latent heat storage units. The latent heat storage units may also be insulated by an electrical insulator arranged between them.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
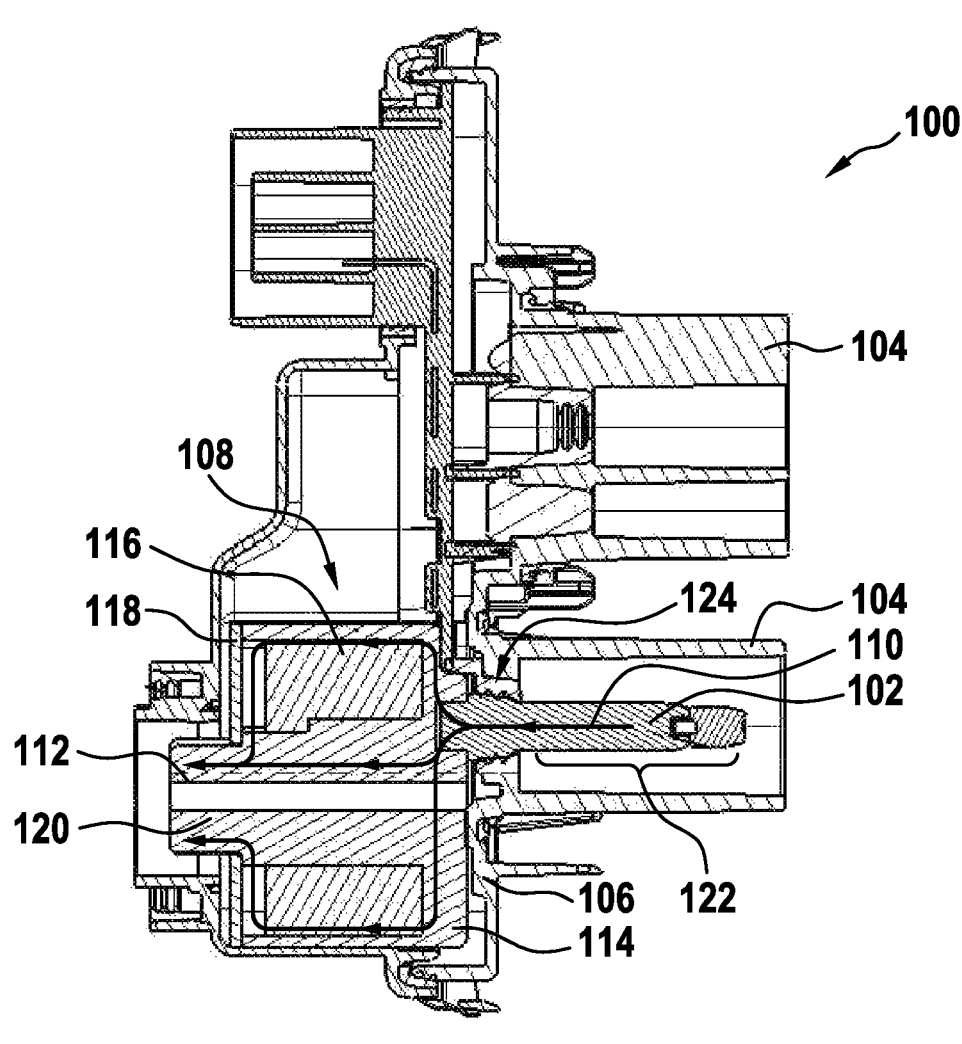
FIG. 1 shows a cross-sectional view of a charging socket according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a cross-sectional representation of a charging socket 100 for a vehicle. The charging socket 100 comprises at least two contact elements 102 for transmitting electrical current. The contact elements 102 are arranged securely inside a plug geometry 104 of a housing 106 of the charging socket 100. Here, the contact elements 102 are DC contacts of the charging socket 100 and are arranged in a DC plug geometry of the charging socket 100. AC contacts of the charging socket 100 are arranged next to the DC plug geometry in their own plug geometry 104.

The contact elements 102 are respectively coupled thermally and electrically to a latent heat storage unit 108. The latent heat storage unit 108 is arranged in a current path 110 of the respective contact element 102 to rear-side terminals 112 for electrical lines of a wiring harness of the vehicle.

The latent heat storage unit 108 comprises an electrically conductive container 114, which is part of the current path 110. The container 114 forms an interior in which a phase change material 116 is arranged. The phase change material 116 becomes liquid when heated to a phase change temperature and solidifies again when cooled below the phase change temperature. The phase change temperature is, in this case, not substantially exceeded or fallen below until all the phase change material 116 has become liquid or solid, respectively.

The container 114 is closed tightly by a lid 118. The lid 118 is shaped as a plate and forms a rear side, facing away from the contact element 102, of the latent heat storage unit 108, or of the container 114. The interior is not fully filled with the phase change material 116. A remaining cavity compensates for volume changes of the phase change material 116.

The terminal 112 is arranged on a dome 120 running centrally through the container 114. The lid 118 has a recess for the dome 120. The dome 120 protrudes beyond the lid 118. The dome 120 forms a contact face for an electrical conductor of the wiring harness, i.e. for example a cable shoe of a cable or a terminal of a busbar. The dome 120 furthermore comprises a central threaded bore for screwing on the cable, or the cable shoe.

The contact element 102 is welded onto the container 114. The welded connection has a high electrical conductivity and a high thermal conductivity. The contact element 102 is welded onto the container 114 while being laterally offset with respect to the dome 120. The contact element 102 is made of a copper material and the container 114 is made of an aluminium material here. The contact element 102 and the container 114 are welded to one another by friction welding. The lid 118 is likewise made of an aluminium material and welded to the container 114 by laser welding.

The contact element 102 comprises a normalized plug region 122 and a short transition region 124. The transition region 124 is arranged between the plug region 122 and the latent heat storage unit 108. The transition region 124 is arranged in the region of a wall of the housing 106 of the charging socket 100. The latent heat storage unit 108 is arranged directly behind the wall. The transition region 124 has a larger cross-sectional area than the plug region 122. The transition region 124 therefore has a lower electrical resistance and a lower thermal resistance than the plug region 122. Heat generated at the plug region 122 can be dissipated rapidly to the latent heat storage unit 108 by the thickened transition region 124.

Figure 2:
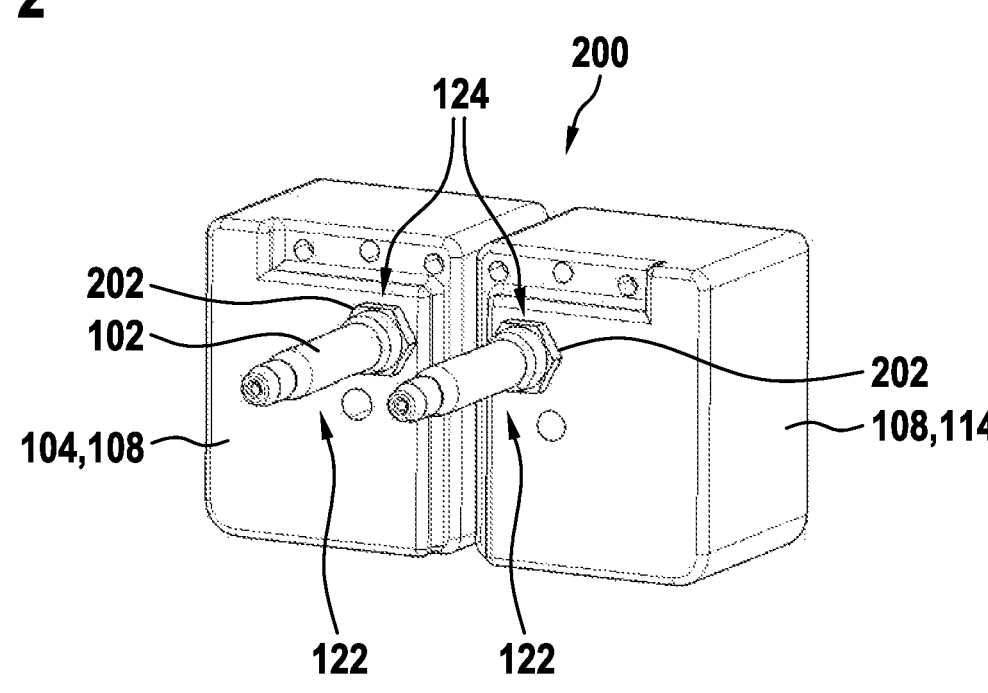
FIG. 2 shows a perspective view of two contact elements, coupled to latent heat storage units, of a charging socket according to one form of the present disclosure.

FIG. 2 shows a three-dimensional representation of two contact elements 102, coupled to latent heat storage units 108, of a charging socket according to one form. The contact elements 102 and latent heat storage units 108 correspond to the representation in FIG. 1. The containers 114 are cubes in FIG. 2. A gap 200 for an electrical insulator is arranged between the containers 114 since the containers 114 are at different electrical potentials during operation.

The contact elements 102 protrude off-centre from the front sides of the latent heat storage units 108 close to the gap 200. The contact elements 102 are in this case spaced apart from one another by a normalized distance.

The contact elements 102 respectively have a drive hexagon 202, via which they were set in rotation during the friction welding onto the latent heat storage units 108. The drive hexagon 202 is respectively arranged in the thickened transition region 124. Damage to the plug region 122 during the friction welding can be inhibited by the drive hexagon 202.

Figure 3:
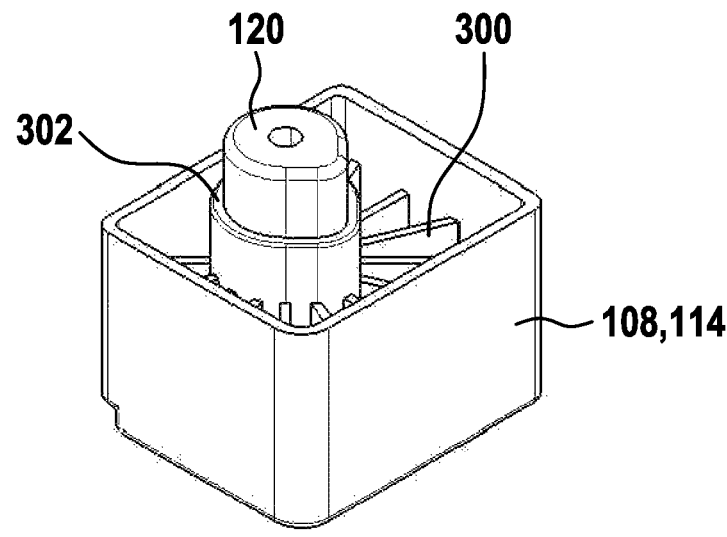
FIG. 3 shows a perspective view of a container of a latent heat storage unit for a charging socket according to one form of the present disclosure.

FIG. 3 shows a three-dimensional representation of a container 114 of a latent heat storage unit 108 for a charging socket according to one form. The container 114 corresponds substantially to one of the containers in FIG. 2. In FIG. 3, the rear side of the latent heat storage unit 108 is represented without the lid. As in FIG. 1, the dome 120 extends through the interior of the container. Fins 300 are arranged between the dome 120 and side walls of the container 114. The fins 300 in this case run radially with respect to the dome 120.

The dome 120 has a shoulder 302 for the lid 118. For the welding, the lid 118 is placed onto the shoulder 302 and a circumferential edge of the side walls and is welded to the shoulder 302 and the edge. The container 114 is therefore closed in a pressure-resistant fashion.

Figure 4:
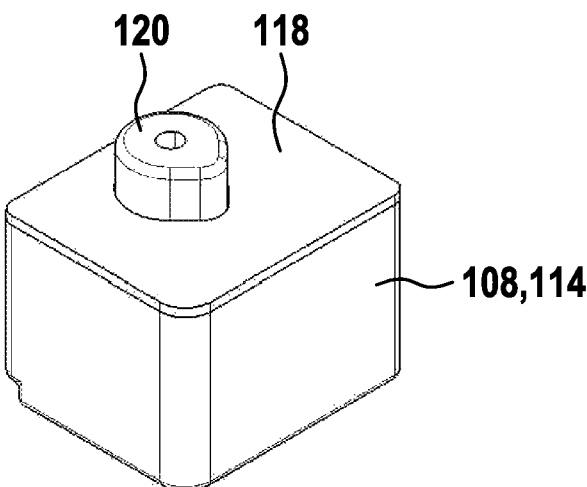
FIG. 4 shows a perspective view of a latent heat storage unit for a charging socket according to one form of the present disclosure.

FIG. 4 shows a three-dimensional representation of a latent heat storage unit 108 for a charging socket according to one form. The latent heat storage unit 108 corresponds to the preceding representations. In FIG. 4, the container 114 is closed in a pressure-resistant fashion by the lid 118. The lid 118 is welded onto the rear side of the latent heat storage unit 108 and fully closes the opening of the container. The dome 120 protrudes through a recess of the lid 118.

Possible configurations of the present disclosure will again be summarised below, or presented with a slightly different wording.

A heat sink having a latent heat storage unit 108 for short-term peak loading in charging sockets is proposed.

Due to the rapid development of battery technology, the charging powers of electric vehicles are increasing from one model generation to the next, sometimes by a multiple. For future vehicles, charging currents of from 732 to 1000 amperes may be desired for a few minutes. Established charging standards such as CCS1, CCS2 or Chademo were designed for up to 500 amperes. Since the power loss increases with the square of the current strength, the normative temperature limits would soon be exceeded. The approach proposed here substantially delays the temperature rise in the contact region, so that the charging system fulfils the specifications.

The established charging standards provide for pin and bushing contacts, one respectively being positioned in the charging socket 100 on the vehicle side and the other being positioned in the charging plug on the infrastructure side. In the approach proposed here, the associated pin or bushing contact in the charging socket 1000 is materially bonded to a metallic hollow body/heat sink that serves both to transmit the current and to store the thermal energy. The hollow body is filled with a phase change material (PCM) 116. Due to the PCM 116 changing phase from solid to liquid in a narrow temperature range, for example from 60 to 70° C., the PCM 116 can absorb the majority of the heat loss. To increase the cooling effect, the pin contact after the normatively defined region can reduce the thermal resistance between the contact region and the heat sink by virtue of a significantly widened conductor cross section or by a short length. By a fin structure in the heat sink, the heat can be transferred very rapidly into the PCM 116. After a charging process at maximum power, the majority of the PCM 116 volume may be melted. The period of time before the next rapid charge is typically long enough for the PCM 116 to become solid again and be available as a buffer storage unit.

By the approach proposed here, shorter charging stops may be achieved on the existing charging infrastructure. Compared to alternative concepts, the charging socket 100 according to the approach proposed here has fewer components and assembly steps and is therefore less expensive. In the approach proposed here, an improved thermal link of the PCM to current-carrying components is achieved, which leads to an improved response behaviour. An increased PCM volume may be held in the hollow body, which leads to an increased effect. Compared to concepts with metallic heat sinks, significantly less weight and installation space may be achieved by the approach proposed here. Compared to concepts with active flushing, the approach proposed here is an autonomous system in which no configuration of the interface to the vehicle is desired. In addition, the approach proposed here has a low susceptibility to error.

There is a clear trend that the charging powers of electric vehicles will increase in the next few years. For future electric car platforms, very high electric charging currents will be desired. For example, 732 A, 800 A and 1000 A will be desired. With such high current strengths, batteries will be almost full within about 5 to 10 minutes.

The present charging standards, for example CCS1, CCS2 or Chademo, were designed for current strengths of up to 500 amperes. The connection of the vehicle to the infrastructure always takes place via a system consisting of a contact pin and contact bushing having defined diameters, for example 8 mm in the case of CCS2. Whereas larger conductor cross sections and/or more efficient active cooling systems are set for the leads, the pin-bushing junction represents a thermal bottleneck. The electrical contact resistance of typical pin-bushing systems on the market is about 20 to 30 ohm in the new state but is much more in the worn state. In the worst case, the coating of the contact elements is abraded so that the basic material, typically copper, oxidises and significantly increases the resistance. Fouling of the contact systems also represents a risk factor.

At 1000 amperes, even in the new state there is a power loss of from 20 to 30 watts at a contact point, which means from 40 to 60 watts per charging socket 100. Due to the small cross section of pin and bushing elements, a heat source of the ohmic material resistance of from 5 to 20 watts per contact point also needs to be taken into account. In the approach proposed here, the energy loss is absorbed by a heat sink having a large thermal mass, so that the temperature rise at the contact point is no greater than the temperature rise at the terminal lines in the vehicle. Due to the uniform temperature rise, the terminal lines may be dimensioned more slimly, which reduces installation space, weight and costs. Further, the approach proposed here contributes to the safety of the charging process. Because heat is dissipated from the contact point, the temperature sensors for monitoring the charging process can follow the actual temperature profile with less deviation. Particularly in the case of aged or fouled contact elements, the deviation may be very great. By the approach proposed here, a safety risk of aged or fouled contact elements can be reduced, and for example a vehicle fire can be inhibited.

Conventionally, because of the short-term heavy loading without active cooling measures, only an insubstantial amount of heat can be dissipated to the installation space. The majority of the heat generated is conventionally stored after the charging process in the form of thermal energy in the lines and contact elements. The increased generation of heat in the normalized contact region is compensated for in the approach proposed here by an additional heat capacity in the immediate vicinity. According to IEC 62196-3, the temperature of the pin and bushing contacts should not exceed 90° C. If a starting temperature of 40° C. is assumed in a hot country, the temperature rise is limited to 50 K. Particularly in this temperature window, the specific heat capacity of metals is substantially less than that of a latent heat storage unit 108 (phase change material, PCM 116) having a suitable phase change temperature. Latent heat storage units typically have a specific heat capacity of 2 J/(g K), compared with 0.39 J/(g K) for copper and 0.89 J/(g K) for aluminium, and can additionally absorb about 170 to 250

J/g during their phase change from solid to liquid. Both organic and inorganic materials are suitable as PCMs 116. In the case of organic PCMs 116, paraffin is the most widespread. Alcohols, fatty acids or composite materials are, however, also possible. Inorganic PCMs 116 are in general salt hydrates, for example sodium acetate dissolved in water.

So that liquid PCM 116 does not escape after the PCM 116 has been activated, the PCM 116 may be enclosed in a hermetically tight hollow body. Since all usual PCMs 116 expand during the phase change, they exert forces onto the surrounding components, or seals. For example, the hollow body is produced by welding two metal components to withstand these loads. To keep the number of components and assembly steps low, the hollow body also conducts the current in addition to the energy buffer function of the hollow body. Two heat sinks are therefore respectively installed per charging socket. The heat sinks may be welded to the two pin or bushing contacts and provide the interface of the charging socket to the wiring harness. The structure has the positive side effect that the heat sinks can compensate for the different pin spacing in CCS1, CCS2, etc. and can represent a uniform interface to the wiring harness. The metal of the heat sink has good electrical and thermal conductivities and a good heat capacity with low costs. In one form, aluminium is used for the heat sink. Alternatively, copper may be used. A material bond with a large cross section between the contact element and the heat sink is advantageous. In the case of a heat sink made of aluminium, the contact elements may for example be connected to the heat sink by rotary friction welding. In the case of a heat sink made of copper, furthermore, laser welding or resistance welding are also possible.

The interface to the wiring harness may, for example, be configured as a screw connection. The screw connection can allow simple replacement of the component parts in the field.

FIG. 1 shows the structure of a CCS2 charging socket having two PCM heat sinks in a sectional view.

The PCM heat sink includes the heat sink, the heat sink lid and the PCM 116. In one form, the heat sink is manufactured as an aluminium casting and the heat sink lid is manufactured as a planar stamped aluminium sheet to allow for a wide range of configuration options with reasonable manufacturing costs. By the component division in the arrangement represented, gates may be avoided during the die casting and assembly in the principal assembly direction of the charging socket 100 is provided. For the sealing, weld seams may be welded to the inner contour and the outer contour of the heat sink lid. Because of the flat, two-dimensional lid, a standard solution is sufficient for the laser welding optics.

The heat sink has the shape of a cup, so that the heat sink can be filled with the PCM 116 in liquid form. After filling with the PCM 116, the heat sink lid may be put in place and welded.

All usual PCMs 116 have a low heat conductivity of <=0.7 W/(m K). A short thermal conduction path in the PCM 116 can allow a good response behaviour. The heat sink may therefore comprise a multiplicity of fins, which can be implemented easily by the die casting method. As an alternative to the die casting method, the heat sink may also be produced by extrusion. An advantage in this case is the improved electrical and thermal conductivity. The design freedom, however, is restricted. The radii on the outer side may be configured to be somewhat larger for extrusion. The number and height of the fins may be reduced. After the PCM heat sink has been sealed, a pin or bushing contact may respectively be welded on. Owing to the round geometry, rotary friction welding is suitable. In this case, the PCM heat sink is kept stationary and the contact part receives a torque applied via a hexagon or a similar geometry and is pressed against the heat sink to allows large-area contact with outstanding transmission of current and heat.

The devices and methods described in detail above may be modified in the usual way by a person skilled in the art to a wide extent without departing from the scope of the present disclosure. For example, the mechanical arrangements and the size proportions of the individual elements with respect to one another are merely exemplary.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer. The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A charging socket for a vehicle, the charging socket comprising at least two contact elements, each contact element having a latent heat storage unit, wherein the latent heat storage unit comprises a phase change material arranged in a container, and wherein the container is thermally coupled to a respective contact element of the at least two contact elements and is arranged in a current path between the respective contact element and a terminal of the respective contact element for a line of a wiring harness of the vehicle.

2. The charging socket according to claim 1, wherein each of the at least two contact elements protrudes from a wall of a respective latent heat storage unit.

3. The charging socket according to claim 1, wherein each of the at least two contact elements comprise a normalized plug region and a transition region to the latent heat storage unit, wherein the transition region has a larger conductor cross section than the plug region.

4. The charging socket according to claim 1, wherein each of the at least two contact elements are materially bonded to a respective latent heat storage unit.

5. The charging socket according to claim 4, wherein each of the at least two contact elements are welded to the respective latent heat storage unit by friction welding.

6. The charging socket according to claim 1, wherein the at least two contact elements and the terminal of each of the at least two contact elements are arranged on opposite sides of a respective latent heat storage unit.

7. The charging socket according to claim 1, wherein the container comprises a welded lid.

8. The charging socket according to claim 1, wherein the container is pressure-resistant.

9. The charging socket according to claim 1, wherein the container comprises fins on an inner side in order to increase a heat transfer area to the phase change material.

10. The charging socket according to claim 1, wherein the latent heat storage units are electrically insulated from one another.

* * * * *